United States Patent
Miller et al.

(10) Patent No.: US 11,535,692 B2
(45) Date of Patent: Dec. 27, 2022

(54) NON-LEACHING STYRENE-FREE CURED-IN-PLACE PIPE SYSTEM SUITABLE FOR POTABLE WATER APPLICATIONS

(71) Applicant: AOC, LLC, Collierville, TN (US)

(72) Inventors: Gregory C Miller, Collierville, TN (US); William Moore, Collierville, TN (US); Luciana Kinnin, Collierville, TN (US); Phillip Waltman, Collierville, TN (US); John McAlvin, Collierville, TN (US)

( * ) Notice: Subject to any disclaimer, the term of this patent is extended or adjusted under 35 U.S.C. 154(b) by 69 days.

(21) Appl. No.: 16/975,284

(22) PCT Filed: Feb. 6, 2019

(86) PCT No.: PCT/US2019/016810
§ 371 (c)(1),
(2) Date: Aug. 24, 2020

(87) PCT Pub. No.: WO2019/164666
PCT Pub. Date: Aug. 29, 2019

(65) Prior Publication Data
US 2021/0380744 A1    Dec. 9, 2021

Related U.S. Application Data

(60) Provisional application No. 62/634,481, filed on Feb. 23, 2018, provisional application No. 62/767,065, filed on Nov. 14, 2018.

(51) Int. Cl.
*C08F 283/01* (2006.01)
*B29C 63/34* (2006.01)
*C08F 290/06* (2006.01)
*B29K 67/00* (2006.01)

(52) U.S. Cl.
CPC ............ *C08F 283/01* (2013.01); *B29C 63/34* (2013.01); *C08F 290/064* (2013.01); *B29K 2067/06* (2013.01)

(58) Field of Classification Search
CPC .... C08F 283/01; C08F 290/064; B29C 63/34; B29K 2067/06
USPC ........................................................ 525/530
See application file for complete search history.

(56) References Cited

U.S. PATENT DOCUMENTS

| | | | | |
|---|---|---|---|---|
| 7,326,752 B2 * | 2/2008 | McAlvin | ................. | C08L 67/06 525/193 |
| 8,586,679 B2 * | 11/2013 | Klein Nagelvoort | ... | C07C 69/01 525/308 |
| 2004/0220340 A1 * | 11/2004 | McAlvin | ............ | C08G 18/8175 525/191 |

\* cited by examiner

*Primary Examiner* — Michael M. Bernshteyn
(74) *Attorney, Agent, or Firm* — Baker Donelson

(57) ABSTRACT

Styrene-free unsaturated polyester resin and vinyl ester resin compositions are provided which contain low amounts of hazardous air pollutants, good mechanical and physical properties, and good corrosion resistant characteristics. The resin systems are such that minimal or no component is leachable after completion of the curing process. The resins are suitable for repair of sewer pipes and potable water pipe systems as part of a cured-in-place pipe application. Additionally, the invention is suitable for relining of storage tanks. A process for the manufacture of these resin compositions is also provided.

15 Claims, No Drawings

NON-LEACHING STYRENE-FREE CURED-IN-PLACE PIPE SYSTEM SUITABLE FOR POTABLE WATER APPLICATIONS

CROSS REFERENCE TO RELATED APPLICATIONS

This application claims the benefit of U.S. Provisional Application No. 62/634,481, filed on Feb. 23, 2018 and U.S. Provisional Application No. 62/767,065, filed on Nov. 14, 2018, under 35 USC § 119(e)(1), the entire contents of which are incorporated herein by reference.

FIELD OF THE INVENTION

The present invention relates to styrene-free polyester and vinyl ester resin compositions. In a more specific aspect, this invention relates to styrene-free unsaturated polyester, vinyl ester, and epoxy resin compositions for cured-in-place pipe applications or tank relining. This invention also relates to a process for the manufacture of these resin compositions.

BACKGROUND OF THE INVENTION

Thermoset resins are a broad class of materials that include both vinyl ester and unsaturated polyester resins, and are used in a variety of applications including casting materials, coatings, and reinforced laminates. Vinyl ester resins are the products of reacting epoxy containing materials with methacrylic acid. Unsaturated polyester resins are the condensation products of dicarboxylic acids or anhydrides with difunctional alcohols. Both vinyl ester resins and unsaturated polyester resins are typically dissolved in a reactive diluent such as styrene. Styrene has been the conventional reactive diluent for both vinyl ester and unsaturated polyester resins because of excellent mechanical and physical properties, relatively low cost, ease of use, and widespread availability. Recently, styrene emissions in open molding facilities have been increasingly restricted by government regulations due to perceived harmful environmental and health effects.

Cured-in-place pipe, or CIPP, is a relining method of rehabilitating pipe systems. During the CIPP process, a tubular laminate, produced from fabric material such as felt, glass fibers, or a combination of fabric and glass fibers is impregnated with a thermosetting vinyl ester, polyester, or epoxy resin containing one or more reactive diluents. The laminate can then be installed into the damaged pipe either by the inversion installation method, in which the laminate is inverted into a pipe system using air or hydrostatic pressure, or the pull-in method, in which the laminate is pulled into the line and inflated against the host pipe using air. In both cases, the resin is cured either by thermal or photo-initiated methods to repair the pipe system. Free radical initiators such as peroxides or UV initiators are typically used in the curing process.

Previous patents have described the method for producing CIPP systems. For example, U.S. Pat. No. 4,009,063 describes impregnating a polyester felt material with an uncured unsaturated polyester resin. The patent also describes curing the system, either by a natural or forced curing process, into a tubular shape to repair a pipe system.

European Patent Publication No. 2 097 369 B1 demonstrates the use of mono and di-functional reactive diluents for vinyl ester resins used in CIPP applications. A similar patent, U.S. Pat. No. 8,586,679 B2, demonstrates a specific maleic anhydride modification to a vinyl ester resin with mono and di-functional reactive diluents developed for CIPP applications.

One obstacle in using vinyl ester or unsaturated polyester resins with reactive diluents in CIPP applications is minimizing the risk of components leaching out of the finished rehabilitated pipe after curing. The leachable components include any uncured reactive diluent, any solvent residue left over from the production of the reactive diluent, or any catalysts that may be used in the production of the resins. Traditional cured-in-place-pipe systems contain resin systems that are thinned in styrene or similar monofunctional reactive diluents, and incomplete cure of these systems may lead to free styrene which can leach out of the cured system. Other small molecule components of the resin system, such as the reaction catalyst, which may not be suitable for human consumption, have been known to leach into the media which is transported through the pipe system. The system in accordance with the present invention minimizes the risk of harmful components leaching into the media being transported through the pipe, and therefore the system is appropriate for applications involving transportation of media that may be consumed by humans, such as potable water.

SUMMARY OF THE INVENTION

Briefly described, the present invention provides curable styrene-free vinyl ester and/or unsaturated polyester resin compositions suitable as components in fabric/fiber laminates used for pipe rehabilitation via the CIPP method. In one embodiment, these resins contain between 20-80 wt % of reactive diluents possessing olefin (i.e., carbon to carbon double bonds) functionalities greater than or equal to three. In another embodiment, these resins contain between 30-70 wt % of reactive diluents possessing olefin functionalities greater than or equal to three. In another embodiment, these resins contain between 35-60 wt % of reactive diluents possessing olefin functionalities greater than or equal to three. In yet another embodiment, these resins contain between 40-50 wt % of reactive diluents possessing olefin functionalities greater than or equal to three. In yet another embodiment, these resins contain between 42-48 wt % of reactive diluents possessing olefin functionalities greater than or equal to three.

Furthermore, the resins are produced using one or more reactive catalysts containing necessary functionality to react into the cured system, and therefore not be available for extraction post-cure. The combination of multifunctional reactive diluent monomer and difunctional reactive catalysts are designed to provide a better cross-linked matrix for cured CIPP systems which are non-leaching and appropriate for potable water applications. The formulations provided in this invention have excellent mechanical and physical properties when cured in a laminate system with, for example, cloth or glass fibers and is suitable for use in CIPP pipe rehabilitation processes.

Accordingly, an object of this invention is to provide vinyl ester and unsaturated polyester resin compositions.

Another object of this invention is to provide styrene-free vinyl ester and unsaturated polyester resin compositions.

Another object of this invention is to provide styrene-free vinyl ester and unsaturated polyester resin compositions with multifunctional reactive diluents.

Another object of this invention is to provide styrene-free vinyl ester and unsaturated polyester resin compositions with multifunctional reactive diluents having mechanical and physical properties that are suitable for cured-in-place pipe applications.

Another object of this invention is to provide styrene-free vinyl ester and unsaturated polyester resin compositions with multifunctional reactive diluents which cure completely into the system to provide non-leaching cured-in-place pipe applications.

Another object of this invention is to provide styrene-free vinyl ester and unsaturated polyester resin compositions with multifunctional reactive diluents and multifunctional reactive catalysts which cure completely into the system to provide non-leaching cured-in-place pipe applications.

These and other objects, features and advantages of this invention will become apparent from the following detailed description.

DETAILED DESCRIPTION OF THE INVENTION

In one embodiment, the present invention provides a curable resin composition, comprising:

(a) a vinyl ester or unsaturated polyester in an amount of about 20-80% by weight, based on the total weight of the composition;

(b) a (meth)acrylate monomer having an olefin functionality of >3 in an amount of about 20-80% by weight, based on the total weight of the composition; and (c) a synthesis catalyst for the production of the vinyl ester or unsaturated polyester which contains at least one reactive double bond. In the compositions of the invention as set forth above, the total amount of components (a), (b), and (c) equal 100 weight percent. As will be appreciated, component (c) is utilized in the manufacture of component (a) and thus is present as residual minor component of (a), the vinyl ester or unsaturated polyester. In other words, the combination of the vinyl ester or unsaturated polyester and the synthesis catalyst comprise the 20-80 weight percent referred to above. As noted below, in certain embodiments, the synthesis catalyst portion of (a) is generally present in an amount of about 0.05 to less than about 0.2 weight percent, based on the total weight of the composition, but this amount is not otherwise critical as the synthesis catalyst is generally utilized in amounts which are effective in catalyzing the reaction which forms the vinyl ester or unsaturated polyester.

The vinyl ester resins and unsaturated polyester resins used according to the present invention may be selected from the unsaturated polyester resins and vinyl ester resin as are known to a person skilled in the art of composites. The compositions may comprise one vinyl ester or unsaturated polyester or may utilize mixtures of vinyl esters and/or unsaturated polyesters. Malik et al., in J. M. S.-Rev. Macromol. Chem. Phys., C40(2&3), p. 139-165 (2000), describes examples of suitable unsaturated polyester or vinyl ester resins to be used as base resin systems in the resins of the present invention, which can be subdivided into the following categories. (1) Ortho-resins: these are based on phthalic anhydride, maleic anhydride, or fumaric acid and glycols, such as 1,2-propylene glycol, ethylene glycol, diethylene glycol, triethylene glycol, 1,3-propylene glycol, dipropylene glycol, tripropylene glycol, neopentyl glycol or hydrogenated bisphenol-A. Commonly the ones derived from 1,2-propylene glycol are used in combination with a reactive diluent such as styrene. (2) Iso-resins: these are prepared from isophthalic acid, maleic anhydride or fumaric acid, and glycols. These resins may contain higher proportions of reactive diluent than the ortho resins. (3) Terephthalic resins: these are prepared from terephthalic acid, maleic anhydride or fumaric acid, and glycols. This class of resins also includes resins in which poly(ethylene terephthalate) is used as a starting material and is converted to monomers through glycolysis in situ. (4) Bisphenol-A-fumarates: these are based on ethoxylated bisphenol-A and fumaric acid. (5) Chlorendics: are resins prepared from chlorine/bromine containing anhydrides or phenols in the preparation of the UP resins. (6) Vinyl ester resins: these are resins having unsaturated sites only in the terminal position. For example introduced by reaction of epoxy resins (e.g. diglycidyl ether of bisphenol-A, epoxies of the phenolnovolac type, or epoxies based on tetrabromobisphenol-A) with (meth)acrylic acid. Instead of (meth)acrylic acid also (meth)acrylamide may be used. The vinyl ester may also be a vinyl ester urethane which may be obtained by reacting a polyfunctional isocyanate with a polyhydric alcohol and/or a polyvalent amine and with a hydroxyalkyl (meth)acrylate. Examples are known from U.S. Pat. Nos. 3,297,745, 3,772, 404, 4,618,658, GB-A-2217722, DE-A-3744390 and EP-A-534197, incorporated herein by reference. Further examples of unsaturated polyester and vinyl ester resins include those available commercially from AOC, LLC under the VIPEL® and ECOTEK™ marks.

As used herein, the term "a (meth)acrylate monomer having an olefin functionality of >3" in certain embodiments refers to (meth)acrylate monomers such as trimethylolpropane tri(meth)acrylate, ethoxylated trimethylolpropane tri(meth)acrylate, propoxlated glycerine tri(meth)acrylate, pentaerythritol tri(meth)acrylate, propoxylated trimethylolpropane tri(meth)acrylate, and tris(2-hydroxyethyl)isocyanurate tri(meth)acrylate.

In another embodiment, the composition further comprises at least one difunctional reactive diluent. Examples of difunctional reactive diluents include 1,4-butanediol di(meth)acrylate, 2,3-butanedioldi(meth)acrylate, 1,6-hexanediol di(meth)acrylate and its isomers, diethyleneglycol di(meth)acrylate, glycerol di(meth)acrylate, trimethylolpropane di(meth)acrylate, neopentyl glycol di(meth)acrylate, tripropyleneglycol di(meth)acrylate, PPG250 di(meth)acrylate, tricyclodecane dimethylol di(meth)acrylate, 1,10-decanediol di(meth)acrylate and/or tetraethylene glycol di(meth)acrylate. Preferred difunctional reactive diluents are 1,4-butanediol di(meth)acrylate, dipropyleneglycol di(meth)acrylate, neopentylglycol di(meth)acrylate, 1,3-butanediol di(meth)acrylate, PEG200 di(meth)acrylate, triethyleneglycol di(meth)acrylate, PEG400 di(meth)acrylate, and/or tripropylene glycol di(meth)acrylate.

In a further embodiment, the composition comprises at least one initiator. Such initiators can be chosen from initiators which are suitable for thermal curing and/or are suitable for curing by photo-initiation. Thermal curing is understood to be using the means of heat to cure a resin composition. In the case of the resin composition being applied for relining, the heat is originated from heated water or gas used to pressurize the (re)lining. Photo-curing is understood to be curing of the resin composition using irradiation with light of a suitable wavelength (photo irradiation) to initiate the curing. This is sometimes also referred to as light cure. In case of relining, the light energy is generally supplied via lamps which are placed or moved forward through the center of the tubular objects. The quantity of initiator utilized in the composition according to the invention in one embodiment lies between about 0.00001-5 wt %, and in another embodiment, this amount lies between 0.1 and 5 wt %.

In one embodiment of the invention, the initiator is a photo-initiator, for example an α-hydroxy aryl ketone, or a cleavage type photo-initiator, for example Irgacure 184, Irgacure 369, Darocure 1173 (Ciba) or acyl phosphine oxides, for example Lucerine TPO, Lucerine TPO-L (BASF), Irgacure 819 (Ciba) or mixtures thereof. In one embodiment, the photoinitiator is an acyl phosphine oxide. The acyl phosphine oxide is a mono acyl phosphine oxide or a bis acyl phosphine oxide. In another embodiment, the bis acyl phosphine oxide is bis(2,4,6-trimethylbenzoyl) phenylphosphine oxide (Irgacure 819). In certain embodiments, the quantity of photo-initiator is between 0.1 and 2 wt. % or between 0.2 and 1 wt. %.

In another embodiment of the invention, the initiator is a thermal initiator. Examples of suitable thermal initiators are azo compounds like azobisisobutyronitrile (AIBN) and derivatives thereof, and organic peroxides. The thermal initiator is preferably an organic peroxide, or a combination of two or more organic peroxides. Examples of suitable peroxides are, for instance, peroxyesters (of the formula —C(O)OO—), peroxy carbonates (of the formula —OC(O)O—), diacylperoxides (of the formula —C(O)OOC(O)—), dialkylperoxides (of the formula —OO—), etc. Oligomeric or polymeric peroxides are also possible. An extensive listing of examples of suitable peroxides can be found, for instance, in US 2002/0091214-A1, paragraph [0018]. The skilled person can easily obtain information about the peroxides and the precautions to be taken in handling the peroxides in the instructions as given by the peroxide producers.

Examples of suitable organic peroxides are: peroxyesters or peracids (such as, for instance, t-butyl peresters, benzoyl peroxide, peracetates and perbenzoates, tertiary alkyl hydroperoxides (such as, for instance, t-butyl hydroperoxide), other hydroperoxides (such as, for instance, cumene hydroperoxide), the special class of hydroperoxides formed by the group of ketone peroxides (perketones, being an addition product of hydrogen peroxide and a ketone, such as, for instance, methyl ethyl ketone peroxide and acetylacetone peroxide), lauryl peroxide, including (di)peroxyesters), perethers (such as, for instance, peroxy diethyl ether). The most common organic peroxides used as curing agent are tertiary peresters- or tertiary hydroperoxides, i.e. peroxy compounds having tertiary carbon atoms directly united to an —OO-acyl or —OOH group. Mixtures of these peroxides with other peroxides may be used in the context of the present invention. The peroxides may also be mixed peroxides, i.e. peroxides containing any two of different peroxygen-bearing moieties in one molecule). In the case of a solid peroxide being used for the curing, the peroxide is in certain embodiments benzoyl peroxide (BPO) or peroxy carbonate peroxide.

Examples of suitable ketone peroxides are cyclohexanone peroxide, methyl-ethyl-ketone peroxide (MEKP), acetylacetone peroxide, and methyl-isobutyl-ketone peroxide. Examples of suitable hydroperoxides are cumene hydroperoxide and tert butyl hydroperoxide.

The resin compositions according to the invention which contain a thermal initiator may further comprise an accelerator, which is in certain embodiments a transition metal compound and/or organic compound. Examples of suitable transition metal compounds are iron, manganese, copper, molybdenum, tungsten, vanadium, cobalt, nickel, chromium compounds. The transition metal compound is preferably a cobalt compound or mixtures of cobalt compound with other metal salts. A suitable cobalt compound is for example cobalt octoate or cobalt naphthenate.

The organic compound can be any organic compound that can be oxidized or reduced. Suitable examples are 1,2-dioxo compounds, 1,3-dioxo compounds, N containing compounds like amides and amines, and thiols. In certain embodiments, the organic compound is an N-containing compound. Examples of N-containing compounds are triethanol amine, diethylaniline, dimethylparatoluidine, diethylhydroxylamine, N,N-diethylacetoacetamide, benzyl amine, p-toluidine, 2-(N-ethylanilino)ethanol, triethyl amine, dimethylaniline, and Jeffamines, like for example Jeffamine D-2000.

In a further embodiment, the compositions according to the invention further comprise one or more inhibitors. The inhibitor can be any radical inhibitor known to the one skilled in the art of composites and can in certain embodiments be chosen from the group of phenolic compounds, stable radicals like N-oxyl based compounds and phenothiazines and/or galvinoxyl. Suitable examples of inhibitors that can be used in the compositions according to the invention are, for instance, methylbenzoquinone, 2-methylhydroquinone, 2-methoxyphenol, 4-methoxyphenol, 2,6-di-t-butylphenol, 2,4,6-trimethyl-phenol, 2,4,6-tris-dimethylaminomethyl phenol, 4,4'-thio-bis(3-methyl-6-t-butylphenol), 4,4'-isopropylidene diphenol, 2,4-di-t-butylphenol, 2,6-di-t-butyl-4-methylphenol, 6,6'-di-t-butyl-2,2'-methylene di-p-cresol, hydroquinone, 2-t-butylhydroquinone, 2,5-di-t-butylhydroquinone, 2,6-di-t-butylhydroquinone, 2,6-dimethylhydroquinone, 2,3,5-trimethylhydroquinone, catechol, 4-t-butylcatechol, 4,6-di-t-butylcatechol, benzoquinone, 2,3,5,6-tetrachloro-1,4-benzoquinone, 2,6-dimethylbenzoquinone, napthoquinone, 1-oxyl-2,2,6,6-tetramethylpiperidine, 1-oxyl-2,2,6,6-tetramethylpiperidine-4-ol (a compound also referred to as TEMPOL), 1-oxyl-2,2,6,6-tetramethylpiperidine-4-one (a compound also referred to as TEMPON), 1-oxyl-2,2,6,6-tetramethyl-4-carboxyl-piperidine (a compound also referred to as 4-carboxy-TEMPO), 1-oxyl-2,2,5,5-tetramethylpyrrolidine, 1-oxyl-2,2,5,5-tetramethyl-3-carboxylpyrrolidine (also called 3-carboxy-PROXYL), aluminium-N-nitrosophenyl hydroxylamine, diethylhydroxylamine, phenothiazine and/or derivatives or combinations of any of these compounds.

In certain embodiments, the amount of inhibitor in the resin composition according to the invention is in the range of from 0.00001 to 5% by weight, from 0.0001 to 2% by weight, or from 0.001 to 1% by weight.

As used herein, the term "synthesis catalyst" means a compound used in the synthesis of polyesters or vinyl esters which increases the rate of the reaction without undergoing any permanent chemical change. Example classes of compounds include stannous compounds, amines, phosphonium salts, and ammonium salts. Specific examples include stannous oxalate, stannous oxoate, stannous dichloride, butyl stannoic acid, 2-ethylhexanoate, dibutylin diacetate, dibutylin oxide, dibutylin dilaurate, dibutylin dichloride, dimethylamylamine, dimethylbutylamine, triphenyl phosphine, butyltriphenylphosphonium formate, ethyltriphenylphosphonium formate, butyltriphenylphosphonium oxalate, ethyltriphenylphosphonium phosphate, ethyltriphenylphosphonium succinate, ethyltriphenylphosphonium malonate, acetylcholine chloride, (2-aminoethyl)trimethylammonium chloride, benzalkonium chloride, benzyltributylammonium bromide, diallyldimethylammonium chloride, N,N-dimethylaminoethyl acrylate, and 2-(dimethylamino)ethyl acrylate methyl chloride. In general terms, the synthesis catalyst component (c) is present in an amount of less than about 0.2 weight percent, or in a range of about 0.05 weight percent to about 0.2 weight percent, based on the total weight of the composition components (a), (b), and (c), although this amount is not generally critical and is merely chosen as to what amount is effective in catalyzing the reaction involved in the formation of the vinyl ester or unsaturated polyester (component (a)).

The invention also relates to the use of the resin composition according to the invention in a flexible, sleeve-shaped object for use in (re)lining. According to the invention the flexible, sleeve-shaped objects contain a supporting or reinforcing material that is impregnated with the curable resin composition, at least one of the surfaces of the sleeve-shaped object being provided with a barrier layer that is impermeable to the resin composition.

The supporting or reinforcing material of which the flexible, sleeve-shaped object is manufactured from, for example, a fibrous web or needle felt of glass fibers, polyester fibers, carbon fibers, boron fibers, metal fibers, silica fibers, asbestos fibers, polyamide fibers (for example Kevlar® from Du Pont), cotton fibers, quartz fibers, silk fibers, polyethylene fibers and jute fibers. The person skilled in the art can readily determine the suitable fibers for a specific application or desired property of the structural element to be formed. Carbon fibers may be used, for example, when the application requires low weight and a high rigidity.

The barrier layer that is impermeable to the curable resin composition and that is provided at least one of the surfaces of the sleeve-shaped object can be a film layer of comprised of a thermoplastic which is commonly polyethylene, polypropylene, polyamide, etc. Accordingly, in a further aspect, the invention provides a flexible, sleeve-shaped supporting or reinforcing material which is impregnated with the curable resin of the invention, at least one of the surfaces of said material being provided with a barrier layer that is impermeable to the resin composition.

The resin composition according to the invention in addition optionally contains a filler in a weight ratio of 0.05:1 to 20:1 or in a weight ratio of 0.2:1 to 3:1, relative to the total weight of the components in the resin, the total of the weight percentages of the components being 100. Suitable fillers include calcium carbonate, alumina trihydrate, microcrystalline silica, mica, quartz powder, barite, fibers and/or talc.

In a further aspect, the invention provides a method for (re)lining a tube, tank, or vessel with a thermoset resin composite structure, said method comprising the steps:

(a) introducing into said tube, tank, or vessel, a flexible sleeve containing the composition of the invention;

(b) pressurizing said tube, tank, or vessel, whereby said flexible sleeve is forced against the wall of said tube, tank, or vessel, and (c) said flexible sleeve is subjected to free radical polymerization to afford a structural thermoset resin lining.

Whenever used in this application, the term "styrene-free" will be understood to mean that the resin compositions of this invention contain neither styrene nor an analogue of styrene. The term "(meth)acrylate" will be understood to include both "acrylate" and "methacrylate" and the term "molecular weight" will be understood to mean weight average molecular weight.

Further, we have found that the use of trifunctional materials enhances the cure of the composite and allows for a much lower percentage of unreacted materials in the composite pipe. Difunctional materials have two reactive groups, whereas trifunctional materials have three groups capable of reacting by free radical cure. With a 50% increase in the reactive sites per molecule, the opportunities for a pipe with material fully reacted and no "free material" is greatly enhanced. As a consequence, the use of trifunctional materials provides improved mechanical properties that can be surprisingly more rigid than provided with styrene alternatives including monomers, difunctional reactives, multifunctional acrylates and methacrylates.

This invention can be further illustrated by the following Examples of certain embodiments thereof, although it will be understood that these Examples are included merely for purposes of illustration and are not intended to limit the scope of the invention unless otherwise specifically indicated.

EXAMPLES

Example 1. Bisphenol-A vinyl ester resin was produced by the following procedure. Diglycidyl ether of bisphenol-A and methacrylic acid were combined at 68.6 wt % and 31.2 wt %, respectively, in a resin kettle with diallyldimethylammonium chloride and butylated hydroxytoluene at 1300 ppm and 1000 ppm, respectively. The mixture was heated to 120° C. under air and held at a constant temperature, with agitation, until an acid number of 11 mg KOH/g and a viscosity of 40 P @ 60° C. were achieved. The resin was then added to ethoxylated trimethylolpropane triacrylate until a solids content of 60 wt % was achieved. This resin, which contains 40 wt % trifunctional acrylate diluent, was the base for the formulations found in Tables 1-18.

Example 2. Novolac vinyl ester resin is produced by the following procedure. Phenol Novolac epoxy and methacrylic acid are combined at 66.6 wt % and 33.1 wt %, respectively, in a resin kettle with diallyldimethylammonium chloride and butylated hydroxytoluene at 1500 ppm and 2000 ppm, respectively. The mixture is heated to 117° C. under air and held at a constant temperature, with agitation, until an acid number of 28 mg KOH/mg and viscosity of 55 at 80° C. are achieved. The resin is then added to ethoxylated trimethylolpropane triacrylate until a solids content of 60 wt % is achieved. This resin, which contains 40 wt % trifunctional acrylate diluent, is the base for the formulations found in Tables 19-36.

The (re)lining resin composition of the present invention uses a base epoxy resin-polymer precursor described in Examples 1 and 2.

Example Formulations

TABLE 1

| Ingredient | % |
| --- | --- |
| Example 1 Bisphenol-A vinyl ester resin (contains 40 wt % ethoxylated trimethylolpropane triacrylate) | 33.8 |
| Butadiene copolymer air release agent | 0.2 |
| AEROSIL 200 HV | 0.5 |
| Hydroquinone monomethyl ether - HQMME | 0.1 |
| Ethoxylated trimethylolpropane triacrylate | 6.5 |
| Trimethylolpropane trimethacrylate | 2 |
| Alumina Trihydrate | 56.9 |
| Total | 100 |

TABLE 2

| Ingredient | % |
|---|---|
| Example 1 Bisphenol-A vinyl ester resin (contains 40 wt % ethoxylated trimethylolpropane triacrylate) | 58.9 |
| Butadiene copolymer air release agent | 0.2 |
| AEROSIL 200 HV | 0.5 |
| Hydroquinone monomethyl ether - HQMME | 0.1 |
| Ethoxylated trimethylolpropane triacrylate | 6.5 |
| Trimethylolpropane trimethacrylate | 2 |
| Alumina Trihydrate | 31.8 |
| Total | 100 |

TABLE 3

| Ingredient | % |
|---|---|
| Example 1 Bisphenol-A vinyl ester resin (contains 40 wt % ethoxylated trimethylolpropane triacrylate) | 87.5 |
| Butadiene copolymer air release agent | 0.2 |
| AEROSIL 200 HV | 0.5 |
| Hydroquinone monomethyl ether - HQMME | 0.1 |
| Alumina Trihydrate | 11.7 |
| Total | 100 |

TABLE 4

| Ingredient | % |
|---|---|
| Example 1 Bisphenol-A vinyl ester resin (contains 40 wt % ethoxylated trimethylolpropane triacrylate) | 83.7 |
| Butadiene copolymer air release agent | 0.2 |
| AEROSIL 200 HV | 0.5 |
| Hydroquinone monomethyl ether - HQMME | 0.1 |
| Ethoxylated trimethylolpropane triacrylate | 6.5 |
| Trimethylolpropane trimethacrylate | 2 |
| Alumina Trihydrate | 7 |
| Total | 100 |

TABLE 5

| Ingredient | % |
|---|---|
| Example 1 Bisphenol-A vinyl ester resin (contains 40 wt % ethoxylated trimethylolpropane triacrylate) | 90.7 |
| Butadiene copolymer air release agent | 0.2 |
| AEROSIL 200 HV | 0.5 |
| Hydroquinone monomethyl ether - HQMME | 0.1 |
| Ethoxylated trimethylolpropane triacrylate | 6.5 |
| Trimethylolpropane trimethacrylate | 2 |
| Total | 100 |

TABLE 6

| Ingredient | % |
|---|---|
| Example 1 Bisphenol-A vinyl ester resin (contains 40 wt % ethoxylated trimethylolpropane triacrylate) | 78.6 |
| Butadiene copolymer air release agent | 0.2 |
| AEROSIL 200 HV | 0.5 |
| Hydroquinone monomethyl ether - HQMME | 0.1 |
| Ethoxylated trimethylolpropane triacrylate | 18.6 |
| Trimethylolpropane trimethacrylate | 2 |
| Total | 100 |

TABLE 7

| Ingredient | % |
|---|---|
| Example 1 Bisphenol-A vinyl ester resin (contains 40 wt % ethoxylated trimethylolpropane triacrylate) | 61.9 |
| Butadiene copolymer air release agent | 0.2 |
| AEROSIL 200 HV | 0.5 |
| Hydroquinone monomethyl ether - HQMME | 0.1 |
| Ethoxylated trimethylolpropane triacrylate | 35.3 |
| Trimethylolpropane trimethacrylate | 2 |
| Total | 100 |

TABLE 8

| Ingredient | % |
|---|---|
| Example 1 Bisphenol-A vinyl ester resin (contains 40 wt % ethoxylated trimethylolpropane triacrylate) | 45.2 |
| Butadiene copolymer air release agent | 0.2 |
| AEROSIL 200 HV | 0.5 |
| Hydroquinone monomethyl ether - HQMME | 0.1 |
| Ethoxylated trimethylolpropane triacrylate | 52 |
| Trimethylolpropane trimethacrylate | 2 |
| Total | 100 |

TABLE 9

| Ingredient | % |
|---|---|
| Example 1 Bisphenol-A vinyl ester resin (contains 40 wt % ethoxylated trimethylolpropane triacrylate) | 28.6 |
| Butadiene copolymer air release agent | 0.2 |
| AEROSIL 200 HV | 0.5 |
| Hydroquinone monomethyl ether - HQMME | 0.1 |
| Ethoxylated trimethylolpropane triacrylate | 68.6 |
| Trimethylolpropane trimethacrylate | 2 |
| Total | 100 |

TABLE 10

| Ingredient | % |
|---|---|
| Example 1 Bisphenol-A vinyl ester resin (contains 40 wt % ethoxylated trimethylolpropane triacrylate) | 50 |
| Butadiene copolymer air release agent | 0.2 |
| AEROSIL 200 HV | 0.5 |
| Hydroquinone monomethyl ether - HQMME | 0.1 |
| Triethyleneglycol dimethacrylate | 8.5 |
| Alumina Trihydrate | 40.7 |
| Total | 100 |

TABLE 11

| Ingredient | % |
| --- | --- |
| Example 1 Bisphenol-A vinyl ester resin (contains 40 wt % ethoxylated trimethylolpropane triacrylate) | 75 |
| Butadiene copolymer air release agent | 0.2 |
| AEROSIL 200 HV | 0.5 |
| Hydroquinone monomethyl ether - HQMME | 0.1 |
| Triethyleneglycol dimethacrylate | 8.5 |
| Alumina Trihydrate | 15.7 |
| Total | 100 |

TABLE 12

| Ingredient | % |
| --- | --- |
| Example 1 Bisphenol-A vinyl ester resin (contains 40 wt % ethoxylated trimethylolpropane triacrylate) | 90.8 |
| Butadiene copolymer air release agent | 0.2 |
| AEROSIL 200 HV | 0.5 |
| Triethyleneglycol dimethacrylate | 8.5 |
| Total | 100 |

TABLE 13

| Ingredient | % |
| --- | --- |
| Example 1 Bisphenol-A vinyl ester resin (contains 40 wt % ethoxylated trimethylolpropane triacrylate) | 84.4 |
| Butadiene copolymer air release agent | 0.2 |
| AEROSIL 200 HV | 0.5 |
| Hydroquinone monomethyl ether - HQMME | 0.1 |
| Ethoxylated trimethylolpropane triacrylate | 6.3 |
| Triethyleneglycol dimethacrylate | 8.5 |
| Total | 100 |

TABLE 14

| Ingredient | % |
| --- | --- |
| Example 1 Bisphenol-A vinyl ester resin (contains 40 wt % ethoxylated trimethylolpropane triacrylate) | 76.1 |
| Butadiene copolymer air release agent | 0.2 |
| AEROSIL 200 HV | 0.5 |
| Hydroquinone monomethyl ether - HQMME | 0.1 |
| Ethoxylated trimethylolpropane triacrylate | 14.6 |
| Triethyleneglycol dimethacrylate | 8.5 |
| Total | 100 |

TABLE 15

| Ingredient | % |
| --- | --- |
| Example 1 Bisphenol-A vinyl ester resin (contains 40 wt % ethoxylated trimethylolpropane triacrylate) | 67.7 |
| Butadiene copolymer air release agent | 0.2 |
| AEROSIL 200 HV | 0.5 |
| Hydroquinone monomethyl ether - HQMME | 0.1 |
| Ethoxylated trimethylolpropane triacrylate | 23 |
| Triethyleneglycol dimethacrylate | 8.5 |
| Total | 100 |

TABLE 16

| Ingredient | % |
| --- | --- |
| Example 1 Bisphenol-A vinyl ester resin (contains 40 wt % ethoxylated trimethylolpropane triacrylate) | 51.1 |
| Butadiene copolymer air release agent | 0.2 |
| AEROSIL 200 HV | 0.5 |
| Hydroquinone monomethyl ether - HQMME | 0.1 |
| Ethoxylated trimethylolpropane triacrylate | 39.6 |
| Triethyleneglycol dimethacrylate | 8.5 |
| Total | 100 |

TABLE 17

| Ingredient | % |
| --- | --- |
| Example 1 Bisphenol-A vinyl ester resin (contains 40 wt % ethoxylated trimethylolpropane triacrylate) | 34.5 |
| Butadiene copolymer air release agent | 0.2 |
| AEROSIL 200 HV | 0.5 |
| Hydroquinone monomethyl ether - HQMME | 0.1 |
| Ethoxylated trimethylolpropane triacrylate | 56.2 |
| Triethyleneglycol dimethacrylate | 8.5 |
| Total | 100 |

TABLE 18

| Ingredient | % |
| --- | --- |
| Example 1 Bisphenol-A vinyl ester resin (contains 40 wt % ethoxylated trimethylolpropane triacrylate) | 17.7 |
| Butadiene copolymer air release agent | 0.2 |
| AEROSIL 200 HV | 0.5 |
| Hydroquinone monomethyl ether - HQMME | 0.1 |
| Ethoxylated trimethylolpropane triacrylate | 73 |
| Triethyleneglycol dimethacrylate | 8.5 |
| Total | 100 |

TABLE 19

| Ingredient | % |
| --- | --- |
| Example 2 Novolac vinyl ester resin (contains 40 wt % ethoxylated trimethylolpropane triacrylate) | 33.8 |
| Butadiene copolymer air release agent | 0.2 |
| AEROSIL 200 HV | 0.5 |
| Hydroquinone monomethyl ether - HQMME | 0.1 |
| Ethoxylated trimethylolpropane triacrylate | 6.5 |
| Trimethylolpropane trimethacrylate | 2 |
| Alumina Trihydrate | 56.9 |
| Total | 100 |

TABLE 20

| Ingredient | % |
| --- | --- |
| Example 2 Novolac vinyl ester resin (contains 40 wt % ethoxylated trimethylolpropane triacrylate) | 58.9 |
| Butadiene copolymer air release agent | 0.2 |
| AEROSIL 200 HV | 0.5 |
| Hydroquinone monomethyl ether - HQMME | 0.1 |

TABLE 20-continued

| Ingredient | % |
| --- | --- |
| Ethoxylated trimethylolpropane triacrylate | 6.5 |
| Trimethylolpropane trimethacrylate | 2 |
| Alumina Trihydrate | 31.8 |
| Total | 100 |

TABLE 21

| Ingredient | % |
| --- | --- |
| Example 2 Novolac vinyl ester resin (contains 40 wt % ethoxylated trimethylolpropane triacrylate) | 87.5 |
| Butadiene copolymer air release agent | 0.2 |
| AEROSIL 200 HV | 0.5 |
| Hydroquinone monomethyl ether - HQMME | 0.1 |
| Alumina Trihydrate | 11.7 |
| Total | 100 |

TABLE 22

| Ingredient | % |
| --- | --- |
| Example 2 Novolac vinyl ester resin (contains 40 wt % ethoxylated trimethylolpropane triacrylate) | 83.7 |
| Butadiene copolymer air release agent | 0.2 |
| AEROSIL 200 HV | 0.5 |
| Hydroquinone monomethyl ether - HQMME | 0.1 |
| Ethoxylated trimethylolpropane triacrylate | 6.5 |
| Trimethylolpropane trimethacrylate | 2 |
| Alumina Trihydrate | 7 |
| Total | 100 |

TABLE 23

| Ingredient | % |
| --- | --- |
| Example 2 Novolac vinyl ester resin (contains 40 wt % ethoxylated trimethylolpropane triacrylate) | 90.7 |
| Butadiene copolymer air release agent | 0.2 |
| AEROSIL 200 HV | 0.5 |
| Hydroquinone monomethyl ether - HQMME | 0.1 |
| Ethoxylated trimethylolpropane triacrylate | 6.5 |
| Trimethylolpropane trimethacrylate | 2 |
| Total | 100 |

TABLE 24

| Ingredient | % |
| --- | --- |
| Example 2 Novolac vinyl ester resin (contains 40 wt % ethoxylated trimethylolpropane triacrylate) | 78.6 |
| Butadiene copolymer air release agent | 0.2 |
| AEROSIL 200 HV | 0.5 |
| Hydroquinone monomethyl ether - HQMME | 0.1 |
| Ethoxylated trimethylolpropane triacrylate | 18.6 |
| Trimethylolpropane trimethacrylate | 2 |
| Total | 100 |

TABLE 25

| Ingredient | % |
| --- | --- |
| Example 2 Novolac vinyl ester resin (contains 40 wt % ethoxylated trimethylolpropane triacrylate) | 61.9 |
| Butadiene copolymer air release agent | 0.2 |
| AEROSIL 200 HV | 0.5 |
| Hydroquinone monomethyl ether - HQMME | 0.1 |
| Ethoxylated trimethylolpropane triacrylate | 35.3 |
| Trimethylolpropane trimethacrylate | 2 |
| Total | 100 |

TABLE 26

| Ingredient | % |
| --- | --- |
| Example 2 Novolac vinyl ester resin (contains 40 wt % ethoxylated trimethylolpropane triacrylate) | 45.2 |
| Butadiene copolymer air release agent | 0.2 |
| AEROSIL 200 HV | 0.5 |
| Hydroquinone monomethyl ether - HQMME | 0.1 |
| Ethoxylated trimethylolpropane triacrylate | 52 |
| Trimethylolpropane trimethacrylate | 2 |
| Total | 100 |

TABLE 27

| Ingredient | % |
| --- | --- |
| Example 2 Novolac vinyl ester resin (contains 40 wt % ethoxylated trimethylolpropane triacrylate) | 28.6 |
| Butadiene copolymer air release agent | 0.2 |
| AEROSIL 200 HV | 0.5 |
| Hydroquinone monomethyl ether - HQMME | 0.1 |
| Ethoxylated trimethylolpropane triacrylate | 68.6 |
| Trimethylolpropane trimethacrylate | 2 |
| Total | 100 |

TABLE 28

| Ingredient | % |
| --- | --- |
| Example 2 Novolac vinyl ester resin (contains 40 wt % ethoxylated trimethylolpropane triacrylate) | 50 |
| Butadiene copolymer air release agent | 0.2 |
| AEROSIL 200 HV | 0.5 |
| Hydroquinone monomethyl ether - HQMME | 0.1 |
| Triethyleneglycol dimethacrylate | 8.5 |
| Alumina Trihydrate | 40.7 |
| Total | 100 |

TABLE 29

| Ingredient | % |
| --- | --- |
| Example 2 Novolac vinyl ester resin (contains 40 wt % ethoxylated trimethylolpropane triacrylate) | 75 |
| Butadiene copolymer air release agent | 0.2 |
| AEROSIL 200 HV | 0.5 |
| Hydroquinone monomethyl ether - HQMME | 0.1 |

TABLE 29-continued

| Ingredient | % |
| --- | --- |
| Triethyleneglycol dimethacrylate | 8.5 |
| Alumina Trihydrate | 15.7 |
| Total | 100 |

TABLE 30

| Ingredient | % |
| --- | --- |
| Example 2 Novolac vinyl ester resin (contains 40 wt % ethoxylated trimethylolpropane triacrylate) | 90.8 |
| Butadiene copolymer air release agent | 0.2 |
| AEROSIL 200 HV | 0.5 |
| Triethyleneglycol dimethacrylate | 8.5 |
| Total | 100 |

TABLE 31

| Ingredient | % |
| --- | --- |
| Example 2 Novolac vinyl ester resin (contains 40 wt % ethoxylated trimethylolpropane triacrylate) | 84.4 |
| Butadiene copolymer air release agent | 0.2 |
| AEROSIL 200 HV | 0.5 |
| Hydroquinone monomethyl ether - HQMME | 0.1 |
| Ethoxylated trimethylolpropane triacrylate | 6.3 |
| Triethyleneglycol dimethacrylate | 8.5 |
| Total | 100 |

TABLE 32

| Ingredient | % |
| --- | --- |
| Example 2 Novolac vinyl ester resin (contains 40 wt % ethoxylated trimethylolpropane triacrylate) | 76.1 |
| Butadiene copolymer air release agent | 0.2 |
| AEROSIL 200 HV | 0.5 |
| Hydroquinone monomethyl ether - HQMME | 0.1 |
| Ethoxylated trimethylolpropane triacrylate | 14.6 |
| Triethyleneglycol dimethacrylate | 8.5 |
| Total | 100 |

TABLE 33

| Ingredient | % |
| --- | --- |
| Example 2 Novolac vinyl ester resin (contains 40 wt % ethoxylated trimethylolpropane triacrylate) | 67.7 |
| Butadiene copolymer air release agent | 0.2 |
| AEROSIL 200 HV | 0.5 |
| Hydroquinone monomethyl ether - HQMME | 0.1 |
| Ethoxylated trimethylolpropane triacrylate | 23 |
| Triethyleneglycol dimethacrylate | 8.5 |
| Total | 100 |

TABLE 34

| Ingredient | % |
| --- | --- |
| Example 2 Novolac vinyl ester resin (contains 40 wt % ethoxylated trimethylolpropane triacrylate) | 51.1 |
| Butadiene copolymer air release agent | 0.2 |
| AEROSIL 200 HV | 0.5 |
| Hydroquinone monomethyl ether - HQMME | 0.1 |
| Ethoxylated trimethylolpropane triacrylate | 39.6 |
| Triethyleneglycol dimethacrylate | 8.5 |
| Total | 100 |

TABLE 35

| Ingredient | % |
| --- | --- |
| Example 2 Novolac vinyl ester resin (contains 40 wt % ethoxylated trimethylolpropane triacrylate) | 34.5 |
| Butadiene copolymer air release agent | 0.2 |
| AEROSIL 200 HV | 0.5 |
| Hydroquinone monomethyl ether - HQMME | 0.1 |
| Ethoxylated trimethylolpropane triacrylate | 56.2 |
| Triethyleneglycol dimethacrylate | 8.5 |
| Total | 100 |

TABLE 36

| Ingredient | % |
| --- | --- |
| Example 2 Novolac vinyl ester resin (contains 40 wt % ethoxylated trimethylolpropane triacrylate) | 17.7 |
| Butadiene copolymer air release agent | 0.2 |
| AEROSIL 200 HV | 0.5 |
| Hydroquinone monomethyl ether - HQMME | 0.1 |
| Ethoxylated trimethylolpropane triacrylate | 73 |
| Triethyleneglycol dimethacrylate | 8.5 |
| Total | 100 |

We claim:

1. A curable resin composition, comprising:
   (a) a vinyl ester or unsaturated polyester;
   (b) a (meth)acrylate monomer having an olefin functionality of greater than or equal to 3 in an amount of about 20-80% by weight; based on the total weight of the composition, and
   (c) a synthesis catalyst for the production of the vinyl ester or unsaturated polyester which contains at least one reactive double bond;
   wherein components (a) and (c) combined are present in an amount of about 20-80% by weight, based on the total weight of the composition.

2. The composition of claim 1, wherein (b) is present in an amount of about 30-70% by weight.

3. The composition of claim 1, wherein (b) is present in an amount of about 35-60% by weight.

4. The composition of claim 1, wherein (b) is present in an amount of about 40-50% by weight.

5. The composition of claim 1, wherein (b) is present in an amount of about 42-48% by weight.

6. The composition of claim 1, further comprising at least one di-functional reactive diluent.

7. The composition of claim 6, wherein the di-functional reactive diluent is selected from the group consisting of 1,4-butanediol dimethacrylate, neopentylglycol dimethacrylate, polyethylene glycol 200 dimethacrylate, polyethylene glycol 400 dimethacrylate, triethyleneglycol dimethacrylate, tripropylene glycol dimethacrylate, 1,4-butanediol diacrylate, neopentylglycol diacrylate, polyethylene glycol 200 diacrylate, polyethylene glycol 400 diacrylate, triethyleneglycol diacrylate and/or tripropylene glycol diacrylate.

8. The composition of claim 6, wherein said di-functional reactive diluent is present in an amount of less than 9% by weight.

9. The composition of claim 1, wherein the component (b) is selected from the group consisting of trimethylolpropane trimethacrylate, ethoxylated trimethylolpropane trimethacrylate, propoxlated glycerine trimethacrylate, pentaerythritol trimethacrylate, propoxylated trimethylolpropane trimethacrylate, and tris(2-hydroxyethyl)isocyanurate trimethacrylate, trimethylolpropane triacrylate, ethoxylated trimethylolpropane triacrylate, propoxlated glycerine triacrylate, pentaerythritol triacrylate, propoxylated trimethylolpropane triacrylate, and tris(2-hydroxyethyl)isocyanurate triacrylate.

10. The composition of claim 1, wherein the synthesis catalyst is selected from the group consisting of diallyldimethylammonium chloride, N,N-dimethylaminoethyl acrylate, and 2-(dimethylamino)ethyl acrylate methyl chloride.

11. The composition of claim 1, further comprising at least one initiator.

12. The composition of claim 1 or 11, further comprising at least one inhibitor.

13. A flexible, sleeve-shaped supporting or reinforcing material which is impregnated with the curable resin of claim 1, at least one of the surfaces of said material being provided with a barrier layer that is impermeable to the resin composition.

14. A method for (re)lining a tube, tank, or vessel with a thermoset resin composite structure, said method comprising the steps:
  (a) introducing into said tube, tank, or vessel, a flexible sleeve containing the composition of claim 1;
  (b) pressurizing said tube, tank, or vessel, whereby said flexible sleeve is forced against the wall of said tube, tank, or vessel, and
  (c) said flexible sleeve is subjected to free radical polymerization to afford a structural thermoset resin lining.

15. The method of claim 14, wherein said tube, tank, or vessel holds or carries potable water.

\* \* \* \* \*